July 12, 1966 P. F. KUEBER 3,260,858
COUNTING DEVICE, UTILIZING CONTROLLED RECTIFIERS, WITH
PARTICULAR SEQUENCING MEANS
Filed Aug. 19, 1963
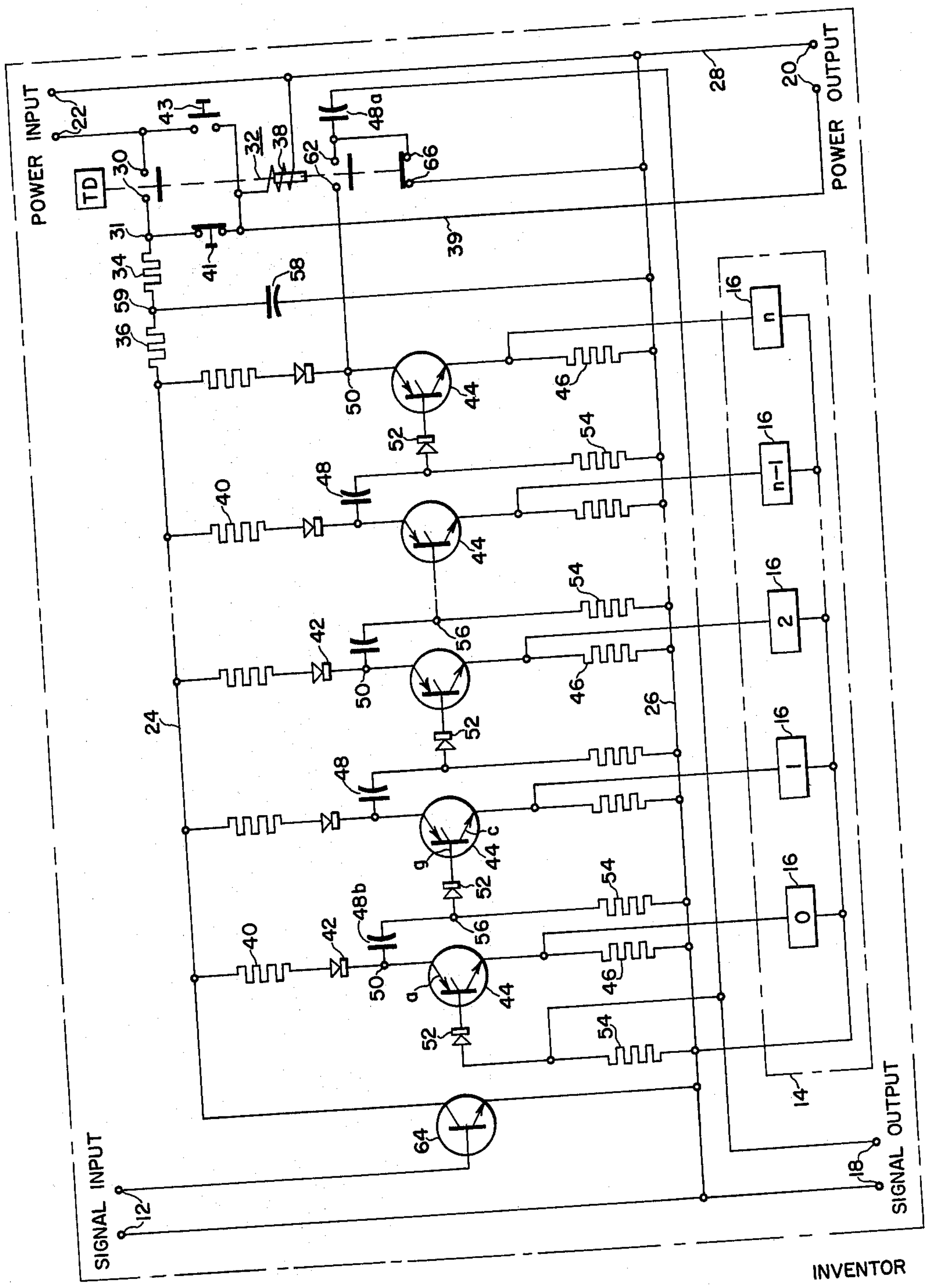
WITNESSES
Theodore F. Wrobel
James F. Young
INVENTOR
Paul F. Kueber
BY John L. Stoughton
ATTORNEY United States Patent Office 3,260,858

Patented July 12, 1966

3,260,858
COUNTING DEVICE, UTILIZING CONTROLLED RECTIFIERS, WITH PARTICULAR SEQUENCING MEANS

Paul F. Kueber, Clearwater, Fla., assignor to Westinghouse Electric Corporation, Pittsburgh, Pa., a corporation of Pennsylvania Filed Aug. 19, 1963, Ser. No. 302,915
3 Claims. (Cl. 307—88.5)

This invention relates generally to counting devices and is particularly adaptable as a counter using solid state discontinuous control type valves.

An object of this invention is to provide a new and improved counter.

Another object of this invention is to provide such a counter which uses a minimum of power.

A still further object of this invention is to provide such a counter which may have as many counting stages as desired.

Other objects of the invention will be apparent from the specification, the appended claims and the drawings, the sole figure of which, illustrates schematically a ring counter embodying the invention.

Referring to the drawings by characters of reference, there is illustrated therein a ring counter having *n* counting stages for totaling the number of input signals applied across its input terminals 12. The ring counter is provided with an indicating device 14 which may comprise *n* light or other indicating means 16. The indicating means or translating devices 16 are preferably provided with indicia illustrated as 0, 1, 2, *n*—1 and *n*, for indicating the number of pulses supplied to the signal input terminals 12. Other suitable indicia may be utilized depending upon the use to which the ring counter is to be put. The indicating or signalling means 16 may also be omitted and the counter 1 utilized to drive in sequence a plurality of inverters to provide a source of polyphase electrical energy. If *n* is equal to nine the ring counter may be used as a decade counter. As many counters as desired may be connected in a series by connecting the signal output and power output terminals of one such ring counter to the signal and power input terminals of the next subsequent one of the ring counters.

Electrical energy is supplied to the counter by connecting a suitable source of unidirectional potential to the power input terminals 22. One of the terminals 22 is directly connected to a negative bus 26 by a conductor 28 while the other of the power input terminals 22 is connected to a positive bus 24 through normally open contacts 30 of a time delay relay 32 and first and second series connected resistors or voltage dropping elements 34 and 36. An energizing winding 38 of the relay 32 has one terminal connected to the conductor 28 and its other terminal connected to the common point 31 between one of the normally open contacts 30 and resistor 34 through a conductor 39 and a stop switch 41.

A plurality of current paths are connected between the buses 24 and 26. Each of these paths includes a first resistor 40, a diode 42, a discontinuous control type of valve such as a solid state silicon controlled rectifier 44, and a second resistor 46. Each of the rectifiers 44 comprise an anode *a*, a cathode *c* and a gate *g*. The main circuits of the rectifiers 44 which extend between the anode *a* and cathode *c* are rendered conductive by the application of a current pulse which flows through the control circuit which extends between the gate *g* and cathode *c* of the rectifier. Once the rectifiers have been rendered conductive, current therethrough is terminated by external means.

In order to provide selective current pulses for selectively rendering the rectifiers 44 conductive, a plurality of capacitors 48 are individually connected between the common terminals 50 of the diodes 42 and controlled rectifiers 44 of each prior-to-be-actuated current path and the gate *g* of the controlled rectifier 44 of the subsequent-to-be-actuated current paths through a diode 52. Preferably, a plurality of resistors 54 are individually connected between the common terminals 56 of the capacitors 48 and diodes 52 and the negative bus 26. The circuit through the capacitor 48*a* located between the last-to-be-actuated of the current paths and the first-to-be-actuated of the current paths includes a pair of normally open contacts 62 of the relay 32.

A shorting valve 64 which may be a transistor has its emitter-collector circuit connecting the buses 24 and 26 and its base-emitter circuit connected across the signal input terminals 12. The valve 64 is rendered conductive upon the application of an input signal to the signal input terminals 12 to decrease the voltage between the buses 24 and 26 to a critical magnitude which is sufficiently low to reduce the current through the conductive one of the paths so that the rectifier 44 of this path is rendered non-conducting.

It is believed that the remainder of the details of construction may best be understood by a description of operation of the apparatus which is as follows:

Subsequent to the connection of a source of direct current potential to the power input terminals 22, the start switch 43 is closed for a time period which is equal to or somewhat longer than the time delay afforded by the time delay relay 32. Closure of the switch 43 energizes the winding 38 of the time delay relay 32 which thereupon begins to time out. Closure of the switch 43 also initiates the charging of the capacitor 58 which is connected between the common terminal 59 of the resistors 34 and 36 and the negative bus 26. The magnitudes of the resistances of the resistors 34 and 36 and of the capacitance of the capacitor 58 are chosen such that the rate of rise of the potential of the bus 24 is low enough to prevent the charging current of the capacitors 48 from rendering the rectifiers 44 conductive. Preferably the time delay afforded by the relay 32 is greater than the time required to charge the capacitor 58 for a purpose which will be made clear below.

At the end of the time delay period of the relay 32 its normally open contacts 30 and 62 close and its normally closed contacts 66 open. Closure of the contacts 30 completes a direct circuit from one of the input contacts 22 to the common point or terminal 31 in shunt with the start switch 43 which may thereupon be opened without interrupting the energization of the relay 32 and the terminal 31. Opening of the contacts 66 opens the discharge circuit of the capacitor 48*a* which is connected with the rectifier 44 of the energizing path of the *n*th path. Closure of the contacts 62 connects the capacitor 48*a* to the *n*th path whereby charging current flows from the bus 24 through the resistor 40 and diode 42 of the *n*th path to one terminal of the capacitor 48*a*. This charging current then flows from the other terminal of the capacitor 48*a* through diode 52, gate *g* to cathode *c* of the rectifier 44 and resistor 46 of the 0 path. Since as explained above, the capacitor 58 has received a substantial charge and the bus 24 has been elevated in potential above the bus 26, sufficient current flows from the positive bus 24 to cause the rectifier 44, associated with the 0 path, to become conducting and the counter is then in its initial condition with the lamp 16 energized ready to count the pulses supplied to the input terminals 12. With the rectifier 44 of the 0 path conducting the capacitor 48*b* which connects with the common terminal 50 of the 0 path will be discharged through its associated resistor 54. The ring counter will remain in this condition with all of the other controlled rectifiers 44 non-conducting.

Upon application of a control pulse or input signal to the signal input terminals 12, the transistor 64 will conduct, collector to emitter, to reduce the current flow through the conducting controlled rectifier 44 of the 0 path. This control pulse is preferably of short durations so that when the current signal disappears and the transistor 64 again becomes non-conducting, the bus 24 will return to its positive potential. When this occurs a steep wave front pulse of charging current flows to the capacitor 48*b* which will render the rectifier 44 of the first path conducting. This energizes the means 16 of the first path. Subsequent signals which are applied to the input terminals 12 cause the rectifiers 44 to conduct in sequence and energize the various indicating means 16. At the $n+1$ pulse the counter will return to its initial condition. If it is desired to count more than $n+1$ number of signals, a subsequent ring counter may be connected with its signal input terminals 12 connected to the output terminals 18 of the illustrated ring counter and its power input terminals 22 connected to the output terminals 20 of the illustrated ring counter. If $n$ is equal to 9 the counters count through the number 99. Additional counters will permit a greater counting range. The illustrated counter and all subsequent counters may be reset by opening the stop switch 41.

It will be appreciated that with a ring counter such as disclosed by applicant, any number of conducting paths may be used without increase in the power required since only one controlled rectifier 44 conducts at any one time.

Although the invention has been described with reference to a certain specific embodiment thereof, numerous modifications are possible and it is desired to cover all the modifications falling within the spirit and scope of the invention.

What is claimed and is desired to be secured by United States Letters Patent is as follows:

1. In a counting mechanism; a pair of input terminals adapted to be energized from a source of potential, switch means having two pairs of contacts, a plurality of discontinuous control type electric valves; each said valve having a pair of main electrodes and a control electrode operable to control the initiation of conduction between its said main electrodes; a plurality of impedance devices; each of said impedance devices having a first and a second terminal; a plurality of storage elements; each of said storage elements having a first and a second terminal; a first and a second bus; means connecting said buses to said input terminals and including one pair of said contacts and another impedance device connected in series between a said input terminal and a said bus; said one pair of contact being effective when said switch means is in a first condition to connect said buses to said input terminals; sequencing means associated with said buses and effective to reduce and thereafter restore the potential therebetween; said means which reduces said potential comprising a switch connected between said buses; a plurality of sequentially actuated current conducting paths connected between said buses; each said path comprising an individual one of said valves and an individual one of said impedance devices, the said valve which is included in the said path having one of its said main electrodes connected to said second bus, said impedance device which is included in the said path having its said first terminal connected to said first bus and its said second terminal connected to the other of said main electrodes of said valve which is included in the said path; a plurality of charging circuit means of a number equal to the number of said paths, each said circuit means individually connecting an individual one of said storage elements between said buses whereby said storage elements are charged solely as a consequence of the potential between said buses, said charging circuit means further individually including said control electrode and one of said main electrodes of an individual one of the said valves; a plurality of discharging circuit means of a number equal to the number of said paths, each said discharging circuit means individually including an individual one of said storage elements and individually including said main electrodes of an individual one of said valves whereby said paths are sequentially rendered conducting by said sequencing means, one of said charging circuit means connecting one of said storage elements including the other pair of said contacts; said other pair of contacts being effective when said switch means is in a second condition to render said one storage element effective to discharge.

2. In a counting mechanism; a plurality of discontinuous control type electric valves; each said valve having a pair of main electrodes and a control electrode operable to initiate conduction between its said main electrodes and ineffective to interrupt conduction therebetween; a plurality of impedance devices; each of said impedance devices having a first and a second terminal; a plurality of storage elements; each of said storage elements having a first and a second terminal; a first and a second bus; sequencing means associated with said buses and effective to reduce and thereafter restore the potential therebetween; a plurality of sequentially actuated current conducting paths connected between said buses; each said path comprising an individual one of said valves and an individual one of said impedance devices, the said valve which is included in the said path having one of its said main electrodes connected to said second bus, said impedance device which is included in the said path having its said first terminal connected to said first bus and its said second terminal connected to the other of said main electrodes of said valve which is included in the said path; a plurality of charging circuit means of a number equal to the number of said paths; each said circuit means individually connecting an individual one of said storage elements between said buses through a first of said main electrodes and said control electrode of an individual one of said valves whereby said storage elements are charged as a consequence of current flow through said control and said first main electrodes established by the potential between said buses; a plurality of discharging circuit means of a number equal to the number of said paths; each said discharging circuit means individually including an individual one of said storage elements and individually including said main electrodes of an individual one of said valves whereby said paths are sequentially rendered conducting by said sequencing means.

3. The combination of claim 2 in which the potential between said buses is the sole potential for charging said storage elements, said valves are silicon controlled rectifiers, said second bus being positive with respect to said first bus when potential is restored therebetween, ones of said main electrodes being anodes and the other of said main electrodes being cathodes, said first main electrodes being said cathrodes, a plurality of diodes, said diodes being individually connected in series with said control electrodes for flow of current toward said control electrodes, and a plurality of second impedance devices, said second impedance devices being individually connected in said discharging circuit means to shunt the discharge current of said storage elements around the control and first main electrodes of a subsequent valve.

References Cited by the Examiner

UNITED STATES PATENTS

| | | | |
|---|---|---|---|
| 2,876,365 | 3/1959 | Slusser | 307—88.5 |
| 2,955,278 | 10/1960 | Sibley | 315—84.5 |

OTHER REFERENCES

"Application and Circuit Design Notes," Bulletin D410–02, 3–60 Solid State Products, Inc., pages 7 and 12.

RCA Technical Notes, No. 292, June 1959, "Ring Counters Using Thyristors," by William E. Barnette.

Solids State design application Note, Feb. 1962, Dyna-quad 100 kc. N-Bit Shift Register (pages 43 and 45).

ARTHUR GAUSS, *Primary Examiner.*

J. ZAZWORSKY, *Assistant Examiner.*